United States Patent
Brothers

Patent Number: 5,971,663
Date of Patent: Oct. 26, 1999

[54] CULVERT COLLAR

[76] Inventor: Jerry T. Brothers, 27006 NE. 114th Ave., Battle Ground, Wash. 98604-6537

[21] Appl. No.: 08/891,396

[22] Filed: Jul. 10, 1997

[51] Int. Cl.⁶ .................................. F16L 3/10; F16L 3/13
[52] U.S. Cl. ............................ 405/125; 138/107; 248/73; 248/74.4; 248/224.61; 285/61
[58] Field of Search .................................... 405/124–126; 138/106, 107; 248/65, 73, 74.1, 74.4, 220.21, 223.41, 224.61; 285/61

[56] References Cited

U.S. PATENT DOCUMENTS

| | | | |
|---|---|---|---|
| 997,383 | 7/1911 | Foster | 405/124 |
| 2,005,699 | 6/1935 | Gottwald | 285/61 |
| 2,404,531 | 7/1946 | Robertson | 248/68.1 |
| 3,765,629 | 10/1973 | Voelker et al. | 138/106 X |
| 4,099,617 | 7/1978 | Nist, Jr. | 138/106 X |

*Primary Examiner*—Tamara L. Graysay
*Assistant Examiner*—Tara L. Mayo

[57] ABSTRACT

A culvert collar for providing a device that will support a culvert pipe and further reduces the installation time and maintenance time when working with culvert pipes. The inventive device includes a two piece flange assembly that has a first member that has a plurality of tongue portions and a second member with tongue grooves. The first member is placed in position in the trench and the culvert pipe is seated in a semi-circular channel of the first member. The second member is placed over the culvert pipe and held in position by the coupling of the tongues portions with the tongue grooves.

12 Claims, 1 Drawing Sheet

CULVERT COLLAR

BACKGROUND OF THE INVENTION

1. Field of the Invention

The present invention relates to culvert pipe supports and more particularly pertains to a new culvert collar for providing a device that the will support a culvert pipe and further reduces the installation time and maintenance time when working with culvert pipes.

2. Description of the Prior Art

The use of culvert pipe supports is known in the prior art. More specifically, culvert pipe supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art culvert pipe supports include U.S. Pat. No. 5,252,002; U.S. Pat. No. 4,983,070; U.S. Pat. No. 4,993,872; U.S. Pat. No. 4,930,937; and U.S. Pat. No. 5,123,777.

While these devices fulfill their respective, particular objectives and requirements, the aforementioned patents do not disclose a new culvert collar. The inventive device includes a first and second member that is releasable interlocked around the culvert pipe for support and protection.

In these respects, the culvert collar according to the present invention substantially departs from the conventional concepts and designs of the prior art, and in so doing provides an apparatus primarily developed for the purpose of providing a device that will support a culvert pipe and further reduces the installation time and maintenance time when working with culvert pipes.

SUMMARY OF THE INVENTION

In view of the foregoing disadvantages inherent in the known types of culvert pipe supports now present in the prior art, the present invention provides a new culvert collar construction wherein the same can be utilized for providing a device that the will support a culvert pipe and further reduces the installation time and maintenance time when working with culvert pipes.

The general purpose of the present invention, which will be described subsequently in greater detail, is to provide a new culvert collar apparatus and method which has many of the advantages of the culvert pipe supports mentioned heretofore and many novel features that result in a new culvert collar which is not anticipated, rendered obvious, suggested, or even implied by any of the prior art culvert pipe supports, either alone or in any combination thereof.

To attain this, the present invention generally comprises a first and second member that is releasable interlocked around the culvert pipe for support and protection.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new culvert collar apparatus and method which has many of the advantages of the culvert pipe supports mentioned heretofore and many novel features that result in a new culvert collar which is not anticipated, rendered obvious, suggested, or even implied by any of the prior art culvert pipe supports, either alone or in any combination thereof.

It is another object of the present invention to provide a new culvert collar which may be easily and efficiently manufactured and marketed.

It is a further object of the present invention to provide a new culvert collar which is of a durable and reliable construction.

An even further object of the present invention is to provide a new culvert collar which is susceptible of a low cost of manufacture with regard to both materials and labor, and which accordingly is then susceptible of low prices of sale to the consuming public, thereby making such culvert collar economically available to the buying public.

Still yet another object of the present invention is to provide a new culvert collar which provides in the apparatuses and methods of the prior art some of the advantages thereof, while simultaneously overcoming some of the disadvantages normally associated therewith.

Still another object of the present invention is to provide a new culvert collar for providing a device that the will support a culvert pipe and further reduces the installation time and maintenance time when working with culvert pipes.

Yet another object of the present invention is to provide a new culvert collar which includes a first and second member that is releasable interlocked around the culvert pipe for support and protection.

Still yet another object of the present invention is to provide a new culvert collar that is made of a lightweight material that is durable.

Even still another object of the present invention is to provide a new culvert collar that requires no extra or specialized tools for installation and removal upon damage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
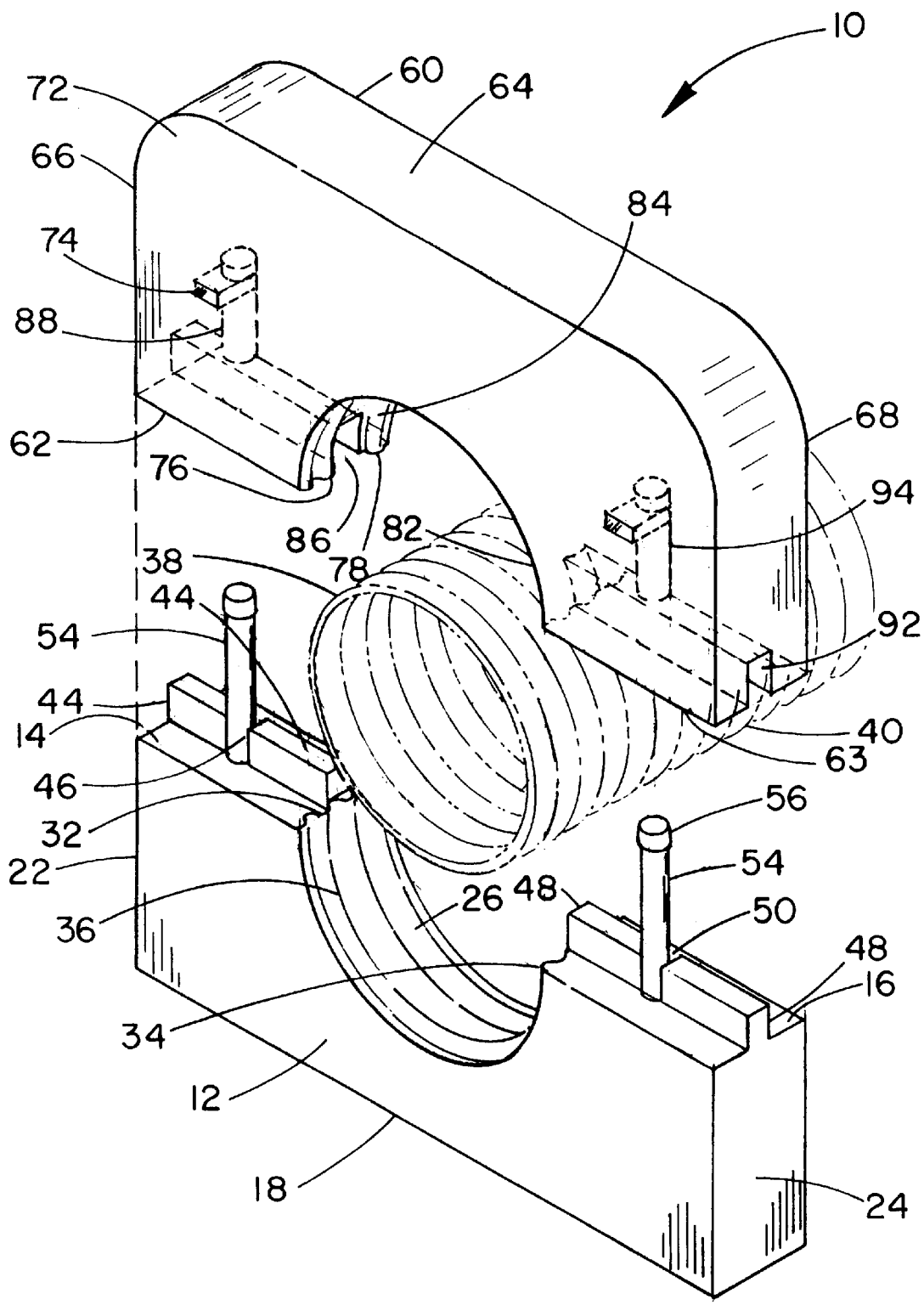
FIG. 1 is a perspective view of a new culvert collar according to the present invention.

With reference now to the drawings, and in particular to FIG. 1 thereof, a new culvert collar embodying the principles and concepts of the present invention and generally designated by the reference numeral 10 will be described.

As best illustrated in FIG. 1, the culvert collar 10 comprises a generally rectangular first member 12. The first member has a first upper edge 14, a second upper edge 16, a lower edge 18 and a pair of side faces 22 and 24. The first and second upper edges are spaced apart by a first semi-circular channel 26 transversely centered thereabout. The first semi-circular channel defines a first pair of interior edges. One of the pair of interior edges 32 is formed at the first upper edge and another of the pair of interior edges 34 is formed at the second upper edge.

The first member is generally sized to accommodate an 18 inch diameter culvert pipe. The first portion is 42 inches wide by approximately 15 inches high. The first member has a thickness of about 6¼ inches.

Also, the first semi-circular channel 26 has a plurality of ridges 36. Each ridge extends the entire diameter of the first semi-circular channel. The plurality of ridges have their beginning at one of the first pair of interior edges 32 and their ending at the other of the first pair of interior edges 34. The first semi-circular channel is sized for receiving a first portion of a culvert pipe 38, while the ridges are spaced within the channel and allow pipe grooves 40 of the culvert pipe to rest within.

The first upper edge 14 of the first member has a first pair of tongue portions 44 projecting upwardly therefrom and a gap 46 between the tongue portions. One of the first pair of tongue portions has an end flush with one of the pair of side faces 22 of the first member. Another of the first pair of tongue portions has an end flush with one of the first pair of interior edges 32 of the channel 26. The first pair of tongue portions are axially centered on the first upper edge.

The second upper edge 16 has a second pair of tongue portions 48 projecting upwardly therefrom and a gap 50 between the tongue portions. One of the second pair of tongue portions has an end flush with one of the pair of side faces 24 of the first member. Another of the second pair of tongue portions has an end flush with one of the first pair of interior edges 34 of the channel. The second pair of tongue portions are axially centered on the second upper edge.

Attached to the first member are a pair of cylindrical rods 54. Each rod extends upwardly about 10 inches from one of the upper edges of the first member 14 and 16. Each rod has a diameter of 2 inches. One of the pair of rods is seated between the first pair of tongue portions 44 of the first upper edge of the first member. Another of the pair of rods is seated between the second pair of tongue portions 48 of the second upper edge of the first member. Each of the pairs of rods has an end cap 56.

Included is a generally rectangular second member 60 having the same general dimensions as the first member. The second member has a first lower edge 62, a second lower edge 63, an upper edge 64 and a pair of side faces 66 & 68. The second member has a front face 72 with a pair of rectangular holes 74. The first and second lower edges are spaced a part by a second semi-circular channel 76 transversely centered thereabout. The second semi-circular channel defines a second pair of interior edges with one interior edge 78 formed at the first lower edge and another interior edge 82 formed at the second lower edge.

Additionally, the second semi-circular channel has a plurality of ridges 84. Just as with the first member, the plurality of ridges of the second member extend the entire diameter of the second semi-circular channel. The plurality of ridges each have their beginning at one of the second pair of interior edges 78 and their ending at the other of the second pair of interior edges 82. The second semi-circular channel is sized for receiving a second portion of the culvert pipe 38, while the ridges are spaced within the channel for receiving the pipe grooves 40 of the culvert pipe.

Cut into the second member at the first lower edge is a first tongue groove 86 and a first elongated rod hole 88. The first tongue groove receives the first pair of tongue portions, while the rod is received within the first elongated rod hole.

Finally, also cut into the second member at the second lower edge 63 is a second tongue groove 92 and a second elongated rod hole 94. The second tongue groove receives the second pair of tongue portions, while the rod is received within the second elongated rod hole. The second member is coupled with the first member by the interlocking of the tongue portions of the first member with the tongue grooves of the second member. The end caps of each rod may be spring loaded for snapping in and out of the rectangular holes 74 of the second member. The coupling of the end caps with the rectangular holes of the second member allows the first and second members to be locked and unlocked in position around the culvert collar.

In use, the present invention culvert collar is made of pre-molded plastic with the rods attached after the molding process. The collar would be structured to receive culvert pipes measuring between 6 to 18 inches. The user of the collar would be required to excavate an additional 6 inch deep trench for the pipe. Once the first member is set in place the culvert pipe wound then be installed in a conventional manner. The second member of the collar would then be slipped over the rods and tongues of the first member with the end caps snapping in place. The pipe trench would then be back filled in a conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A culvert collar for supporting and protecting the end of a culvert pipe comprising in combination:

a generally rectangular first member having a first upper edge, a second upper edge, a lower edge and a pair of side faces, the first and second upper edges being spaced a part by a first semi-circular channel transversely centered thereabouts, the first semi-circular channel defining a first pair of interior edges with one interior edge being formed at the first upper edge and another interior edge being formed at the second upper edge, the first semi-circular channel having a plurality of ridges extending the entire diameter thereof, the plurality of ridges having their beginning at one of the first pair of interior edges and their ending at the other of the first pair of interior edges, the first semi-circular channel being sized for receiving a first portion of a culvert pipe and the ridges being spaced within the channel for allowing pipe grooves of the culvert pipe to rest therein;

the first upper edge having a first pair of tongue portions projecting upwardly therefrom and having a gap therebetween, one of the first pair of tongue portions having an end flush with one of the pair of side faces of the first member, another of the first pair of tongue portions having an end flush with one of the first pair of interior edges of the channel;

the second upper edge having a second pair of tongue portions projecting upwardly therefrom and having a gap therebetween, one of the second pair of tongue portions having an end flush with the other of the pair of side faces of the first member, another of the second pair of tongue portions having an end flush with the other of the first pair of interior edges of the channel;

a pair of cylindrical rods extending upwardly from the upper edge of the first member, one of the pair of rods being seated between the first pair of tongue portions of the first upper edge of the first member, another of the pair of rods being seated between the second pair of tongue portions of the second upper edge of the first member, each of the pair of rods having an end cap;

a generally rectangular second member having a first lower edge, a second lower edge, an upper edge and a pair of side faces, the second member having a front face with a pair of rectangular holes therethrough, the first and second lower edges being spaced a part by a second semi-circular channel transversely centered thereabout, the second semi-circular channel defining a second pair of interior edges with one interior edge being formed at the first lower edge and another interior edge being formed at the second lower edge;

the second semi-circular channel having a plurality of ridges extending the entire diameter thereof, the plurality of ridges having their beginning at one of the second pair of interior edges and their ending at the other of the second pair of interior edges, the second semi-circular channel being sized for receiving a second portion of the culvert pipe and the ridges being spaced within the channel for receiving the pipe grooves of the culvert pipe;

the first lower edge having a first tongue groove and a first elongated rod hole, the first tongue groove receiving the first pair of tongue portions while one of the pair of rods being received within the first elongated rod hole; and the second lower edge having a second tongue groove and a second elongated rod hole, the second tongue groove receiving the second pair of tongue portions while the other of the pair of rods being received within the second elongated rod hole, the second member being coupled with the first member by the interlocking of the tongue portions of the first member with the tongue grooves of the second member.

2. A culvert collar comprising:

a generally rectangular first member having a first upper edge and a second upper edge, the first and second upper edges being spaced a part by a first semi-circular channel transversely centered thereabout, the first semi-circular channel having a plurality of ridges extending the entire diameter thereof, the first semi-circular channel being sized for receiving a first portion of a culvert pipe and the ridges being spaced within the channel for allowing pipe grooves of the culvert pipe to rest therein, the first upper edge having a first pair of tongue portions projecting upwardly therefrom and having a gap therebetween, the second upper edge having a second pair of tongue portions projecting upwardly therefrom and having a gap therebetween;

a pair of cylindrical rods with one of each rod extending upwardly from the first and second upper edge of the first member; and a generally rectangular second member having a first lower edge and a second lower edge, the first and second lower edges being spaced a part by a second semi-circular channel transversely centered thereabout, the first lower edge having a first tongue groove and a first elongated rod hole, the second lower edge having a second tongue groove and a second elongated rod hole, the second semi-circular channel being sized for receiving a second portion of the culvert pipe, the tongue groove and rod hole of the first lower edge and the tongue groove and rod hole of the second lower edges coupled with the tongues and rods of the first member respectively.

3. The culvert collar as set forth in claim 2, wherein the first member has a lower edge and a pair of side faces, and the first semi-circular channel defines a first pair of interior edges with one interior edge being formed at the first upper edge and another interior edge being formed at the second upper edge.

4. The culvert collar as set forth in claim 3, wherein the plurality of ridges have their beginning at one of the first pair of interior edges and their ending at the other of the first pair of interior edges.

5. The culvert collar as set forth in claim 3, wherein one of the first pair of tongue portions having an end flush with one of the pair of side faces of the first member, and another of the first pair of tongue portions that have an end flush with one of the first pair of interior edges of the channel.

6. The culvert collar as set forth in claim 3, wherein one of the second pair of tongue portions having an end flush with the other of the pair of side faces of the first member, and another of the second pair of tongue portions having an end flush with the other of the first pair of interior edges of the channel.

7. The culvert collar as set forth in claim 3, wherein one of the pair of rods is seated between the first pair of tongue portions of the first upper edge of the first member, another of the pair of rods is seated between the second pair of tongue portions of the second upper edge of the first member, and each of the pair of rods has an end cap.

8. The culvert collar as set forth in claim 2, wherein the second member has an upper edge, a pair of side faces and a front face, and the front face has a pair of rectangular holes therethrough.

9. The culvert collar as set forth in claim 2, wherein the second semi-circular channel defines a second pair of interior edges with one interior edge being formed at the first lower edge and another interior edge being formed at the second lower edge.

10. The culvert collar as set forth in claim 9, wherein the second semi-circular channel has a plurality of ridges extending the entire diameter thereof, the plurality of ridges of the second member have their beginning at one of the second pair of interior edges and their ending at the other of the second pair of interior edges, and the ridges are spaced within the channel for receiving the pipe grooves of the culvert pipe.

11. The culvert collar as set forth in claim 2, wherein the first tongue groove receives the first pair of tongue portions while one of the pair of rods is received within the first elongated rod hole.

12. The culvert collar as set forth in claim 2, wherein the second tongue groove receives the second pair of tongue portions while the other pair of rods is received within the second elongated rod hole, the second member being coupled with the first member by the interlocking of the tongue portions of the first member with the tongue grooves of the second member.

* * * * *